R. T. SMITH.
WHEEL FOR VEHICLES.
APPLICATION FILED JUNE 24, 1918.
1,402,678.
Patented Jan. 3, 1922.
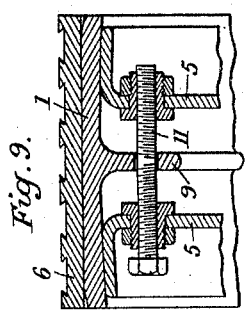
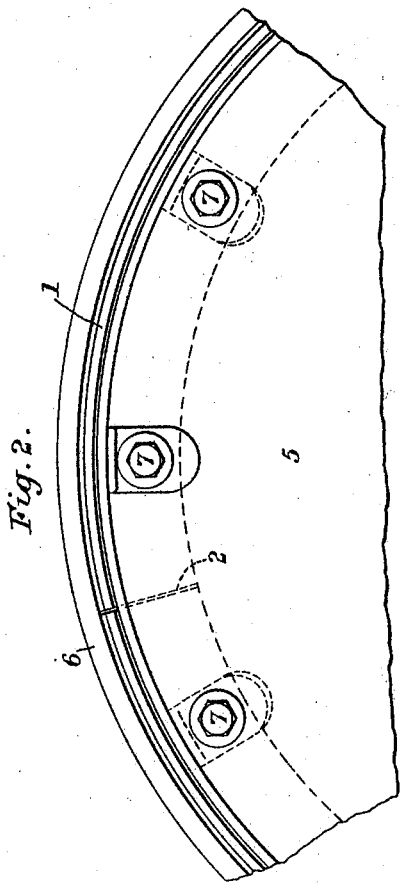
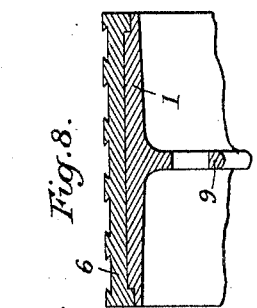
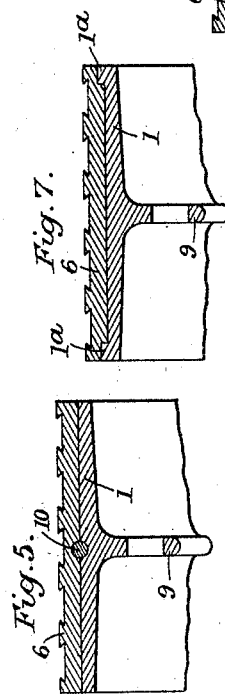
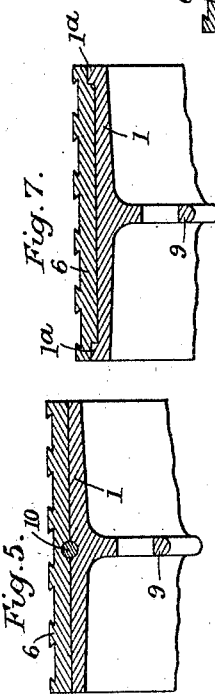
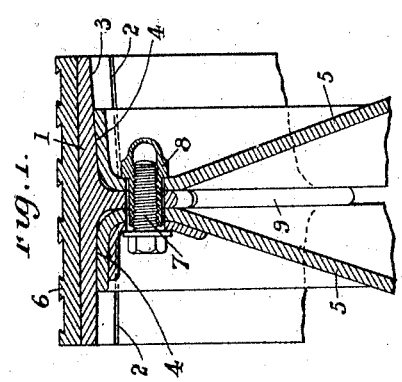
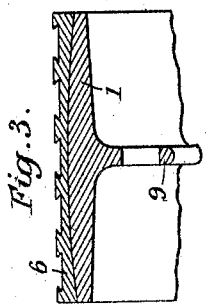
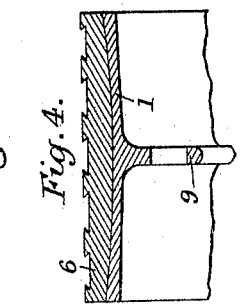
INVENTOR
ROBERT THOMAS SMITH
BY
ATTORNEYS

UNITED STATES PATENT OFFICE.

ROBERT THOMAS SMITH, OF WARRINGTON, ENGLAND.

WHEEL FOR VEHICLES.

1,402,678.  Specification of Letters Patent.  Patented Jan. 3, 1922.

Application filed June 24, 1918. Serial No. 241,679.

(GRANTED UNDER THE PROVISIONS OF THE ACT OF MARCH 3, 1921, 41 STAT. L., 1313.)

*To all whom it may concern:*

Be it known that I, ROBERT THOMAS SMITH, a subject of the King of Great Britain, residing at 111 Lovely Lane, Warrington, in the county of Lancaster, England, have invented new and useful Improvements in Wheels for Vehicles, (for which I have filed an application in Great Britain Aug. 26, 1916, Patent Number 106,385,) of which the following is a specification.

This invention relates to wheels for vehicles, using tyres (especially tyres commercially known as band tyres) which are detachable, the object of this invention being to overcome certain defects in such wheels as hitherto constructed by enabling the tyres to be applied to the wheels without the necessity for the power presses which have hitherto been necessary, this invention also enabling the wheels to be made of pressed steel and rendering it unnecessary to use rivets, or welding, although they may of course be used if desired.

According to this invention the periphery, or rim, of the wheel is separate from the wheel-body and is made expansible, and contractable, and is expanded into the interior of the tyre by movement of the parts of the wheel-body with such force as to securely hold the tyre, whilst by opposite movement of the part of the wheel-body the tyre can be readily released.

I will describe, with reference to the accompanying drawings, manners in which this invention can be performed presuming it to be applied to a wheel fitted with an ordinary band tyre. Figure 1 is a transverse section, and Figure 2 a side elevation, of part of a wheel and the metal base of its tyre connected in accordance with this invention. The other figures shew modifications, as hereinafter explained. In the several figures I have not shewn the complete tyre but only the metal base forming the inner part of the band tyre to which the outer part, or tread of the tyre, is attached, and this may be of any ordinary, or suitable, kind.

Referring to Figures 1 and 2; the rim 1, of the wheel is split at 2, and is made with inclines 3, inwards and the peripheral parts of the members 5, of the body of the wheel are made with tapers 4, to correspond with the inclines 3, so that, when these body members 5, are drawn together, powerful wedging action is produced which forces the wheel rim 1, outwards into firm binding contact with the band 6, of the tyre.

This drawing-in of the parts 5, of the body of the wheel is preferably effected, as shewn, by bolting devices made in two parts one, (the part 7) having a stem externally screwed, the other (the part 8) being a corresponding flanged thimble nut, so that, when these parts 7 and 8 are screwed together, the cylindrical portion of the part 8, will effectually cover the screwed portion of the other part 7, and prevent damage, or binding through rust, or the like, as the cylindrical portion can, if desired, contain lubricant, such, for example, as vaseline.

The inner periphery of the wheel rim 1, may be formed with an inwardly projecting flange, or web, 9, to come between the parts of the body members 5, of the wheel.

To prevent practically all possibility of the shifting of the tyre laterally the inner periphery of its band 6, and the outer periphery of the wheel rim 1, may be concaved and convexed respectively, as shown in Figure 3, or these parts may be otherwise formed, or provided with means, to prevent sideway movements. For example:— Figure 4 shews the band 6, of the tyre convexed and the rim 1, concaved, Figure 5, shews the band 6, and rim 1, secured in position laterally by a wire ring 10, entering a recess in both. Figures 6 and 7 shew the band 6, of the tyre received between upstanding parts 1ª on the rim 1, the band in Figure 6, coming entirely between these upstanding parts, whilst in Figure 7, it is formed to extend up to, and be flush with, the sides of the rim 1, of the wheel. Figure 8 shews an arrangement similar to Figure 7, but with the engaging projection and recesses reversed. In all cases the tyres may be of any suitable description whether solid, pneumatic, or metal, or of various materials combined in any suitable manner.

It will be understood that, although I have described my invention as applied in such a way that the wedging action takes place by inward movement of the parts which exert the wedging action, the inclines can be reversed so that the wedging action is obtained by outward movement of the wedging parts. Such an arrangement is illustrated in Figure 9, where the inner periphery of the split rim 1, of the wheel is made with inclines which are inclined reversely to those shewn in Figure 1, and the tapers on the peripheral parts of the members 5, are correspondingly tapered, the said members 5, being forced away from each other for fixing the tyre in place, which forcing away may be done in any suitable way, such, for example, as by right, and left handed screws working in corresponding nuts in the respective body members 5 of the wheel, one such screw and a pair of nuts being shewn at 11.

It will be evident that, by reversing the movement of the screws in the arrangement Figures 1 and 2 and Figure 9, the circumference of the wheel rim will be reduced and the tyre can be readily removed.

If desired, in order to prevent corrosion, or rusting, of the parts interfering with their proper operation, I may use liners, of material which will withstand corrosion or rusting, between the parts which come in contact and move relatively to each other when securing and releasing the tyre, or I may coat such parts with non-corrosive, or anti-rusting, material; for instance, I may galvanize them, or sherardize them, or electro-deposit copper upon them.

What I claim is:—

1. A vehicle wheel comprising a tyre having a rigid annulus, a wheel rim transversely divided to render it expansible and lying within the tyre annulus, in combination with opposed disc-like body members for the wheel independent of the rim and having offset peripheral flanges bearing against the inner surface of the rim and means forcing said flanges of the wheel body members against the rim with a wedging action to expand the rim against the tyre with a firm binding contact, substantially as described.

2. A vehicle wheel comprising a tyre having a rigid annulus, a wheel rim transversely divided to render it expansible and lying within the tyre annulus, in combination with opposed disc-like body members for the wheel independent of the rim and having offset peripheral flanges with taper surfaces bearing against the inner surface of the rim and means for forcing said flanges of the wheel body members against the rim with a wedging action to expand the rim against the tyre with a firm binding contact, substantially as described.

3. A vehicle wheel comprising a tyre having a rigid annulus, a wheel rim transversely divided to render it expansible and lying within the tyre annulus, said rim having a central inwardly projecting fin, in combination with disc-like body members for the wheel lying on opposite sides of said fin, and independent of the rim and having offset peripheral flanges bearing against the inner periphery of the rim, together with screw means engaging said body members adjacent said flanges and serving to displace the latter against the rim with a wedging action to expand the rim against the tyre annulus with a firm binding engagement, substantially as described.

4. A vehicle wheel comprising a tyre having a rigid annulus, a wheel rim transversely divided to render it expansible and lying within the tyre annulus, said rim having a central inwardly projecting fin, in combination with disc-like body members for the wheel lying on opposite sides of said fin, and independent of the rim and having offset peripheral flanges with taper surfaces bearing against the inner periphery of the rim, together with screw means engaging said body members adjacent said flanges and serving to displace the latter against the rim with a wedging action to expand the rim against the tyre annulus with a firm binding engagement, substantially as described.

In testimony whereof I have signed my name to this specification in the presence of two subscribing witnesses.

ROBERT THOMAS SMITH.

Witnesses:
WILLIAM PARSONS,
FRED SHELLEY.